US010383307B2

(12) United States Patent
Nelson et al.

(10) Patent No.: US 10,383,307 B2
(45) Date of Patent: Aug. 20, 2019

(54) JOINT WITH AUTOMATIC LOCKING JOINT FOR RECONFIGURABLE DEVICE AND METHOD OF MANUFACTURE

(71) Applicants: Shane Nelson, Overland Park, KS (US); Gary Nielsen, Overland Park, KS (US)

(72) Inventors: Shane Nelson, Overland Park, KS (US); Gary Nielsen, Overland Park, KS (US)

(*) Notice: Subject to any disclaimer, the term of this patent is extended or adjusted under 35 U.S.C. 154(b) by 481 days.

(21) Appl. No.: 15/293,492

(22) Filed: Oct. 14, 2016

(65) Prior Publication Data
US 2017/0265427 A1 Sep. 21, 2017

Related U.S. Application Data

(63) Continuation-in-part of application No. 15/075,365, filed on Mar. 21, 2016.

(51) Int. Cl.
F16C 11/10 (2006.01)
A01K 1/01 (2006.01)

(52) U.S. Cl.
CPC ............ *A01K 1/0125* (2013.01); *F16C 11/10* (2013.01); *Y10T 403/32418* (2015.01)

(58) Field of Classification Search
CPC ..... Y10T 403/32254; Y10T 403/62262; Y10T 403/62319; Y10T 403/32344; Y10T 403/32361; Y10T 403/32418; Y10T 403/32426; Y10T 403/32442; Y10T 403/32451; Y10T 403/32459; F16C 11/04; F16C 11/10; F16M 11/06; F16M 11/10; F16M 11/105; F16M 2200/024
See application file for complete search history.

(56) References Cited

U.S. PATENT DOCUMENTS

| | | | |
|---|---|---|---|
| 4,979,469 A | 12/1990 | Clark | |
| 5,123,768 A * | 6/1992 | Franklin | A46B 5/0075 403/84 |
| 5,143,468 A | 9/1992 | Pausch | |
| 5,163,532 A | 11/1992 | McCarty | |
| 5,263,507 A * | 11/1993 | Chuang | E04H 15/46 135/140 |
| 5,551,745 A * | 9/1996 | Huang | B60J 7/1282 135/133 |
| 5,586,363 A | 12/1996 | Fanuzzi | |
| 5,689,999 A | 11/1997 | Wiley et al. | |
| 5,727,265 A | 3/1998 | Ziegler et al. | |
| 6,196,568 B1 | 3/2001 | Stevens | |
| 6,644,611 B1 | 11/2003 | Tai | |
| 7,631,575 B2 | 12/2009 | Gard et al. | |
| 8,132,978 B2 * | 3/2012 | Franklin | B05C 17/022 16/324 |
| 8,656,863 B2 | 2/2014 | Havluciyan | |

(Continued)

OTHER PUBLICATIONS http://www.adjustablelockingtech.com/products_variloc_plastic.php dated Dec. 16, 2016 titled "Medium Duty Thermoplastic Locking Hinges", 1 page.

*Primary Examiner* — Jonathan P Masinick
(74) *Attorney, Agent, or Firm* — Polsinelli PC; Adam C. Rehm

(57) ABSTRACT

An automatic locking joint for use with a reconfigurable device to permit the device to be selectively reconfigurable between various configurations.

18 Claims, 14 Drawing Sheets

(56) References Cited

U.S. PATENT DOCUMENTS

| | | |
|---|---|---|
| 9,068,602 B2 | 6/2015 | Hoe et al. |
| 9,938,746 B2 | 4/2018 | Parsons |
| 10,058,186 B2 * | 8/2018 | Rivera ................... A47C 7/66 |
| 2003/0202840 A1 | 10/2003 | Watkins |
| 2014/0199112 A1 * | 7/2014 | Milner ................ E04F 11/1834 |
| | | 403/72 |
| 2014/0321843 A1 * | 10/2014 | Hulse ................... G03B 17/561 |
| | | 396/420 |
| 2016/0242384 A1 | 8/2016 | Huntinghouse |
| 2017/0339911 A1 | 11/2017 | Fitch |
| 2018/0030752 A1 | 2/2018 | Chen |

* cited by examiner

JOINT WITH AUTOMATIC LOCKING JOINT FOR RECONFIGURABLE DEVICE AND METHOD OF MANUFACTURE

CROSS-REFERENCE TO RELATED APPLICATION

This Patent Application claims priority to and is a continuation-in-part of U.S. patent application Ser. No. 15/075,365 filed Mar. 21, 2016, the entire contents of which is herein incorporated by reference in its entirety.

BACKGROUND

1. Field of the Invention

The present inventive concept relates to an indoor toilet system for use by a pet, and more specifically to a reconfigurable pet potty system with an automatic-locking joint to prevent unintended transformations between various configurations.

2. Description of Related Art

In today's society, it is a common practice for a pet owner to allow a pet, e.g., a dog and/or cat, to live indoors. This practice of housing pets indoors is generally problematic because it is undesirable for the pet to go to the bathroom indoors, e.g., on carpet or other finished surface. As such, the owner must either escort the pet outdoors each time the pet needs to go to the bathroom or install a specialized door, e.g., a "doggy door," to allow the pet to go outside at will.

In virtually all scenarios, the pet must be trained to refrain from going to the bathroom indoors. Further, if the owner is unable to install a specialized door, which is a luxury that is unavailable to many pet owners, the pet must also be trained to signal the pet owner each time the pet needs to go to the bathroom. Before the training process and during, as such typically involves repeated trials and errors, it is common for the pet to go to the bathroom indoors multiple times. Further, even after the training is complete, it is common for the pet to have accidents, e.g., if the pet owner is unavailable and cannot escort the pet outdoors when the pet needs to go to the bathroom, or the pet fails to adhere to the training.

Conventional indoor pet potty devices suffer from a variety of shortcomings. For instance, conventional devices utilize designs that make it difficult to transport, and difficult to clean and maintain. Additionally, some conventional devices utilize designs that make it difficult for a pet to properly use, e.g., the pet may have its front paws on and its rear paws off of the device, which may result in the pet going to the bathroom on a finished surface of an interior of a house.

Thus, there is a need for pet potty system that does not suffer from the shortcomings of conventional devices, e.g., is easy to transport, and easy to clean and maintain.

SUMMARY OF THE INVENTION

The present inventive concept remedies the aforementioned problems associated with indoor pets and conventional pet potties. The present inventive concept provides a reconfigurable pet potty system that is selectively configurable between use and storage configurations. In the use configuration, the system is operable to be used as a toilet by a pet. In the storage configuration, the system is collapsed, with its footprint minimized, thereby facilitating transport and/or storage of the system. The system includes a plurality of different types of joints including a pivot joint that is operable to automatically lock the system in either of the configurations to prevent unintentional transformations of the system between the different configurations.

The aforementioned may be achieved in one aspect of the present inventive concept by providing a reconfigurable pet potty system. The system may include a plurality of frames that may be secured together via a plurality of joints. Each of the frames may be defined by a plurality of elongated frame members. Each of the frames may be selectively pivotable with respect to another one or more of the frames. Each of the frame members may define an interior void. The voids may include a sheet removably secured therein. The plurality of frames may include a base frame secured between opposing wall frames. The plurality of frames may be selectively reconfigurable between a use configuration and a storage configuration.

In the use configuration, the wall frames may extend substantially perpendicular to the base frame. In the storage configuration, the wall frames may extend substantially parallel to the base frame. The plurality of joints may include pivot joints and/or fixed joints. The pivot joints may be operable to allow the wall frames to pivot relative to the base frame. The fixed joints may secure frame members connected thereto in a fixed position relative to each other.

Each of the pivot joints may include a locking mechanism operable to only allow pivoting of the wall frames relative to the base frame while the mechanism is actuated. The locking mechanism may be operable to be actuated by simultaneously (i) depressing a resilient button of the locking mechanism, and/or (ii) pivoting a corresponding one of the wall frames.

The locking mechanism may include a hub that protrudes from a disk having a plurality of apertures extending at least partially therethrough. The apertures may be spaced around a circumference of the disk to define locking points. The locking points may define a pivot range of the wall frames relative to the base frame. The resilient button may include a plurality of posts operable to be removably and at least partially received within the plurality of apertures to cause the wall frames to be secured relative to the base frame. The pivot range between the locking points may be ninety degrees. The two frame members of the base frame may each include a center joint to allow the two frame members to pivot relative to each other.

The aforementioned may be achieved in one aspect of the present inventive concept by providing a method of manufacturing a reconfigurable pet potty system. The method may include the step of securing a plurality of frames together via joints. Each of the frames may be defined by a plurality of elongated frame members. Each of the frames may be selectively pivotable with respect to another one or more of the frames. Each of the frame members may define an interior void. The voids may include a sheet removably secured therein.

The aforementioned may be achieved in one aspect of the present inventive concept by providing a joint. The joint may include a female receiver having (i) a set of through holes extending entirely through the female receiver, and/or (ii) a first set of non-through holes extending partially through the female receiver, adjacent ones of the set of through holes and the first set of non-through holes are adjoined. The joint may further include a male receiver having a second set of non-through holes extending partially through the male receiver, a biasing assembly operable to be at least partially housed in the male receiver and the female receiver, and/or a locking mechanism operable to drive the biasing assembly out of the female receiver. The female receiver may be operable to pivot relative to the male receiver upon actuation of the locking mechanism via application of a force on the locking mechanism. Individual holes of each of (i) the set of through holes, (ii) the first set of non-through holes, and (iii) the second set of non-through holes may be equally sized and/or shaped. Each of the individual holes at least partially may define all or at least part of a circumferential sidewall and/or an end surface. Adjacent ones of the individual holes may have adjoining circumferential sidewalls. The biasing assembly may include a spring at least partially or entirely housed in a sleeve. The spring may be operable to bias the sleeve away from the male receiver and/or into the female receiver. The locking mechanism may include one or more posts of equal size and/or shape. The post may be operable to abut the sleeve and drive the sleeve out of the female receiver and into the male receiver upon actuation of the locking mechanism via the force. The female receiver may only be operable to pivot relative to the male receiver (i) upon actuation of the locking mechanism via the force, and/or (ii) when the biasing assembly has been entirely removed from the female receiver. The biasing assembly may be biased toward the female receiver such that, when the force is removed from the locking mechanism, the biasing assembly may be biased toward and partially received by the female receiver. The locking mechanism may be slidably secured to the female receiver via a fastener. The female receiver and/or the male receiver may be independent operable to connect different portions of a device and permit reconfiguration of the device.

The aforementioned may be achieved in one aspect of the present inventive concept by providing a method of manufacturing a joint. The method may include the step of providing a female receiver having (i) a set of through holes extending entirely through the female receiver, and/or (ii) a first set of non-through holes extending partially through the female receiver, adjacent ones of the set of through holes and the first set of non-through holes are adjoined. The method may further include the step of installing a biasing assembly at least partially within a male receiver. The biasing assembly may be operable to be at least partially housed in the male receiver and the female receiver. The method may further include the step of securing the male receiver to the female receiver via a locking mechanism. The male receiver may have a second set of non-through holes extending partially through the male receiver. The locking mechanism may be operable to drive the biasing assembly out of the female receiver. The female receiver may be operable to pivot relative to the male receiver upon actuation of the locking mechanism via application of a force on the locking mechanism.

Other systems, methods, features, and advantages of the present inventive concept will be or will become apparent to one with skill in the art upon examination of the following figures and detailed description. It is intended that all such additional systems, methods, features, and advantages be included within this description, be within the scope of the present inventive concept, and be protected by the accompanying claims.

BRIEF DESCRIPTION OF THE DRAWINGS

The accompanying figures, which are incorporated in and constitute a part of this specification, illustrate an implementation of the present inventive concept and, together with the description, serve to explain the advantages and principles of the present inventive concept. In the figures.

The figures do not limit the present inventive concept to the specific examples disclosed and described herein, and are not necessarily to scale.

DETAILED DESCRIPTION OF THE INVENTION

The following detailed description references the accompanying figures that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to an "embodiment" or "embodiments" mean that the feature or features being referred to are included in at least one embodiment of the present inventive concept. Separate references to an "embodiment" or "embodiments" do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

Figure 1:
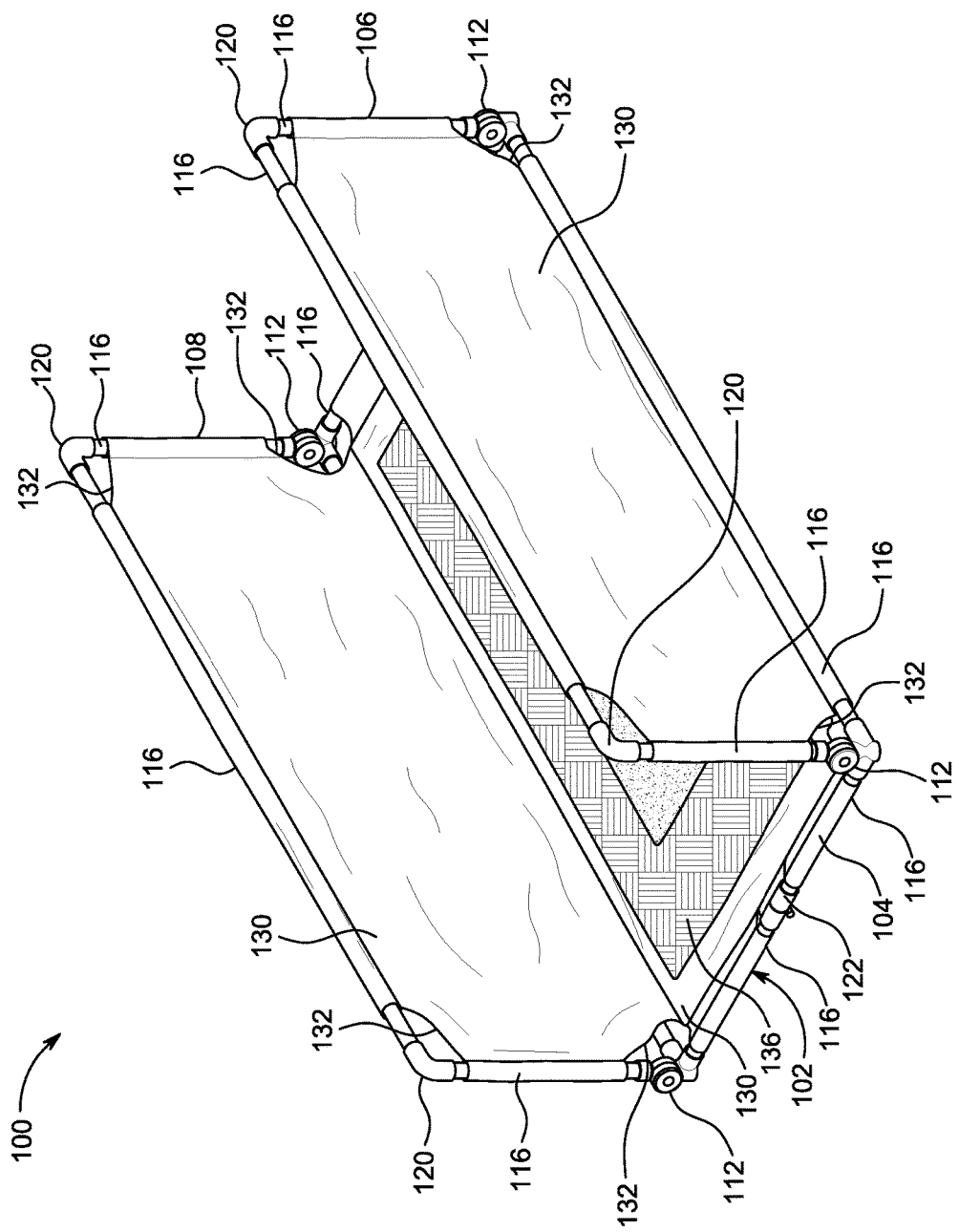
FIG. 1 is a front, left side perspective view of a reconfigurable pet potty system in a use configuration in accordance with the present inventive concept.
Figure 2:
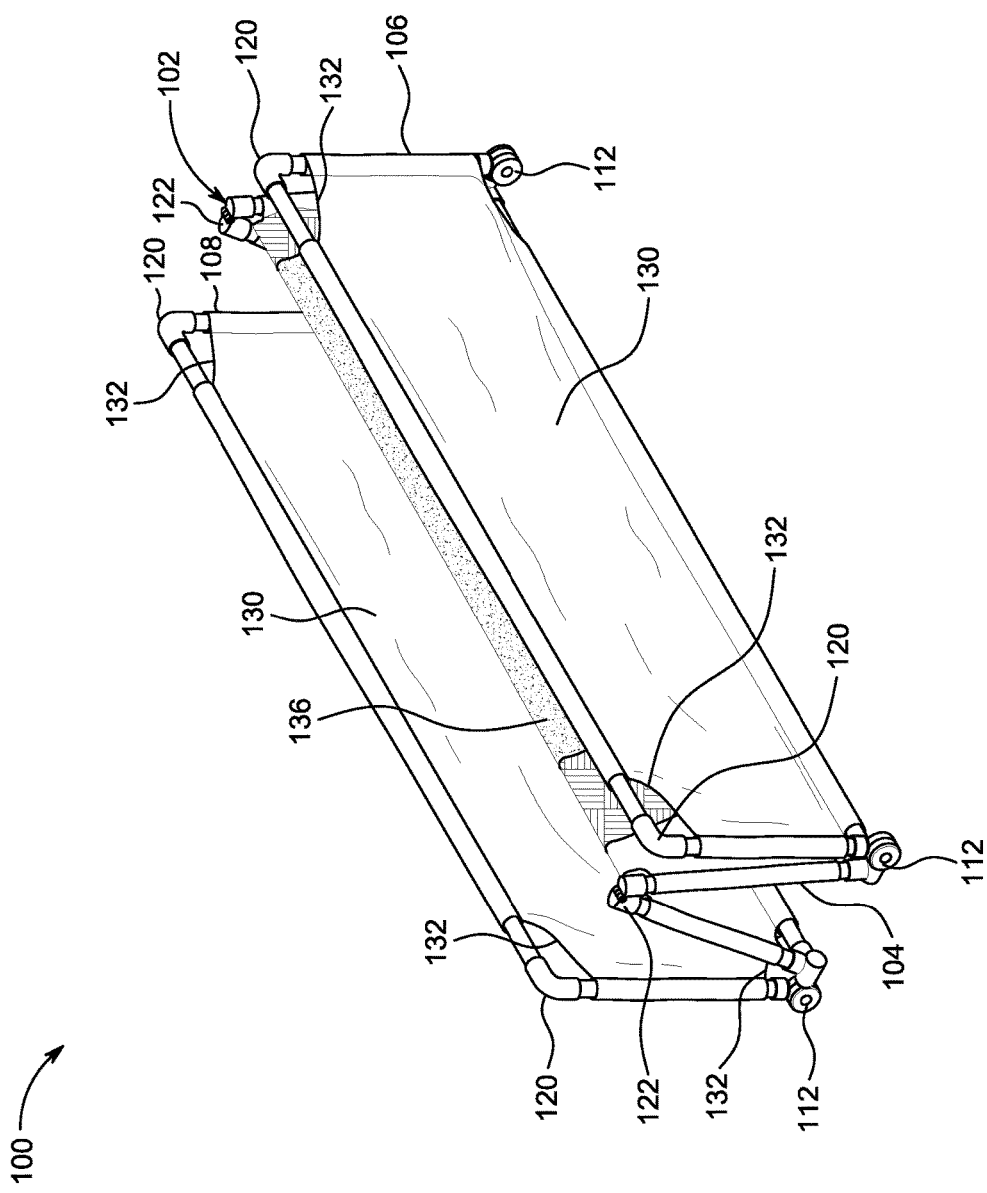
FIG. 2 is a front, left side perspective view of the reconfigurable pet potty system of FIG. 1 in a storage configuration.
Figure 3:
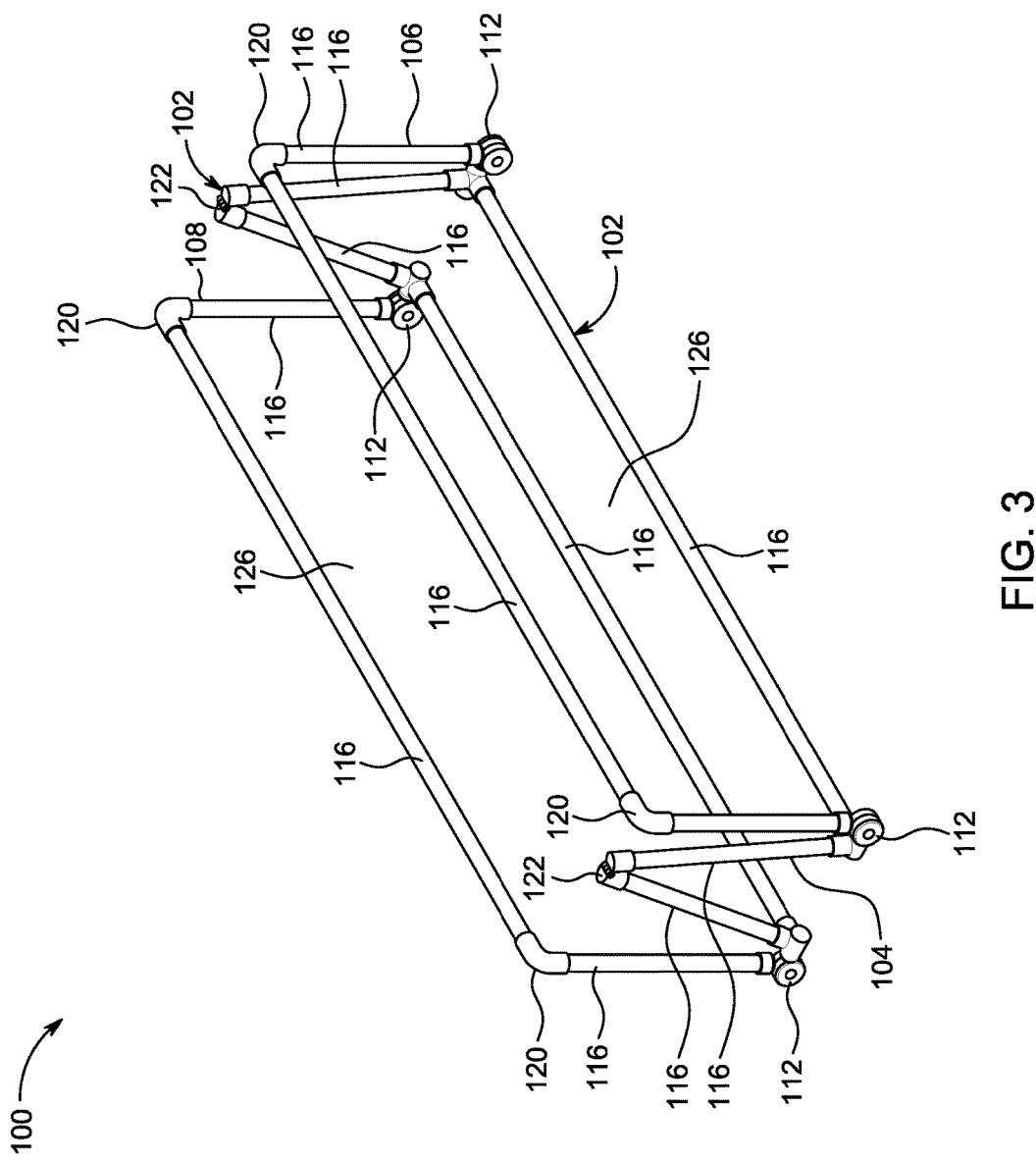
FIG. 3 is a front, left side perspective view of the reconfigurable pet potty system of FIG. 1 in a storage configuration.

Referring now to FIGS. 1 and 2, a preferred embodiment of a reconfigurable pet potty system 100 is illustrated. In the presently preferred embodiment, the pet potty system 100 includes a housing 102 having a plurality of frames, i.e., a first frame or base frame 104, which is secured between opposing second and third frames or wall frames 106, 108. In the preferred embodiment, each of the frames 104, 106, 108 is rectangular and made of plastic, but it is foreseen that any one or more of the frames 104, 106, 108 may be made in any shape, e.g., circular, square, oval, or the like, and made of any material, e.g., metal, glass, wood, and/or a combination of plastic, metal, glass, and/or wood, without deviating from the scope of the present inventive concept.

Each of the frames 104, 106, 108 is secured together via a plurality of pivot joints 112 to allow each of the frames 104, 106, 108 to independently pivot with respect to one of the other frames 104, 106, 108. Specifically, each of the frames 106, 108 is directly independently pivotable with respect to the frame 104 via the joints 112, and indirectly independently pivotable with respect to each other, i.e., frames 106, 108) through the frame 104 via the joints 112, which are further discussed hereafter. It is foreseen that each of the wall frames 106, 108 may be secured to the base frame 104 in a fixed position, e.g., at a ninety degree angle, without deviating from the scope of the present inventive concept. It is also foreseen that one or both of the wall frames 106, 108 may be completely removed from the base frame 104, with the base frame 104 operable for use without one or both of the wall frames 106, 108, without deviating from the scope of the present inventive concept.

Turning to FIGS. 3-9, each of the frames 104, 106, 108 has a structure defined by a plurality of elongated, tubular frame members 116. Each of the frame members 116 is secured together by at least one of the pivot joints 112, a fixed joint 120, and/or an intermediary pivot joint 122. The fixed joint 120 is an elbow or "L" shaped joint.

The frame members 116 of each of the frames 104, 106, 108 define an interior void 126. Each of the interior voids 126 is operable to removably receive a portion of a sheet 130. In the exemplary embodiment, the sheet 130 has an upper layer made of a single unified piece of rectangular fibrous material, e.g., cloth. It is foreseen, however, that the sheet 130 may include a plurality of separate pieces of material, e.g., a separate sheet for each of the frames 104, 106, 108, may be made of same or different materials, e.g., one or more types of plastics, and/or may be made in any shape, without deviating from the scope of the present inventive concept. The sheet 130 is sized and shaped to slidably receive each of the frame members 116 along each side of the sheet 130 during assembly of the system 100. The sheet 130 conforms to a shape defined by each of the frame members 116 of each of the frames 104, 106, 108, upon assembly of the frame members 116, as illustrated by FIGS. 1 and 2. When the frame members 116 are fully assembled, the frame members 116 maintain the sheet 130 in a stretched or taut configuration so that the sheet 130 substantially fills an entirety of each of the interior voids 126. In the exemplary embodiment, the sheet 130 includes cutout portions 132 to facilitate installation and removal of the sheet 130, e.g., for cleaning or replacement of the sheet 130, and to accommodate reconfigurations of the system 100, which is further discussed hereafter.

A center portion of the sheet 130 includes an absorbent pad 136, which is made of a material that is impenetrable by liquid to prevent liquid from penetrating through the absorbent pad 136 and onto a surface beneath the absorbent pad 136. When the sheet 130 is installed on the system 100, the frame members 116 cause the absorbent pad 136 to be oriented substantially within the interior void 126 defined by the base frame 104. In the exemplary embodiment, the absorbent pad 136 includes an upper layer made of a piece of rectangular fibrous material, e.g., cloth, and a lower layer made of a piece of rectangular material that is impenetrable by liquid, e.g., plastic. It is foreseen, however, that the absorbent pad 136 may be made of other materials or combinations thereof, and/or made of any shape, without deviating from the scope of the present inventive concept.

Figure 11:
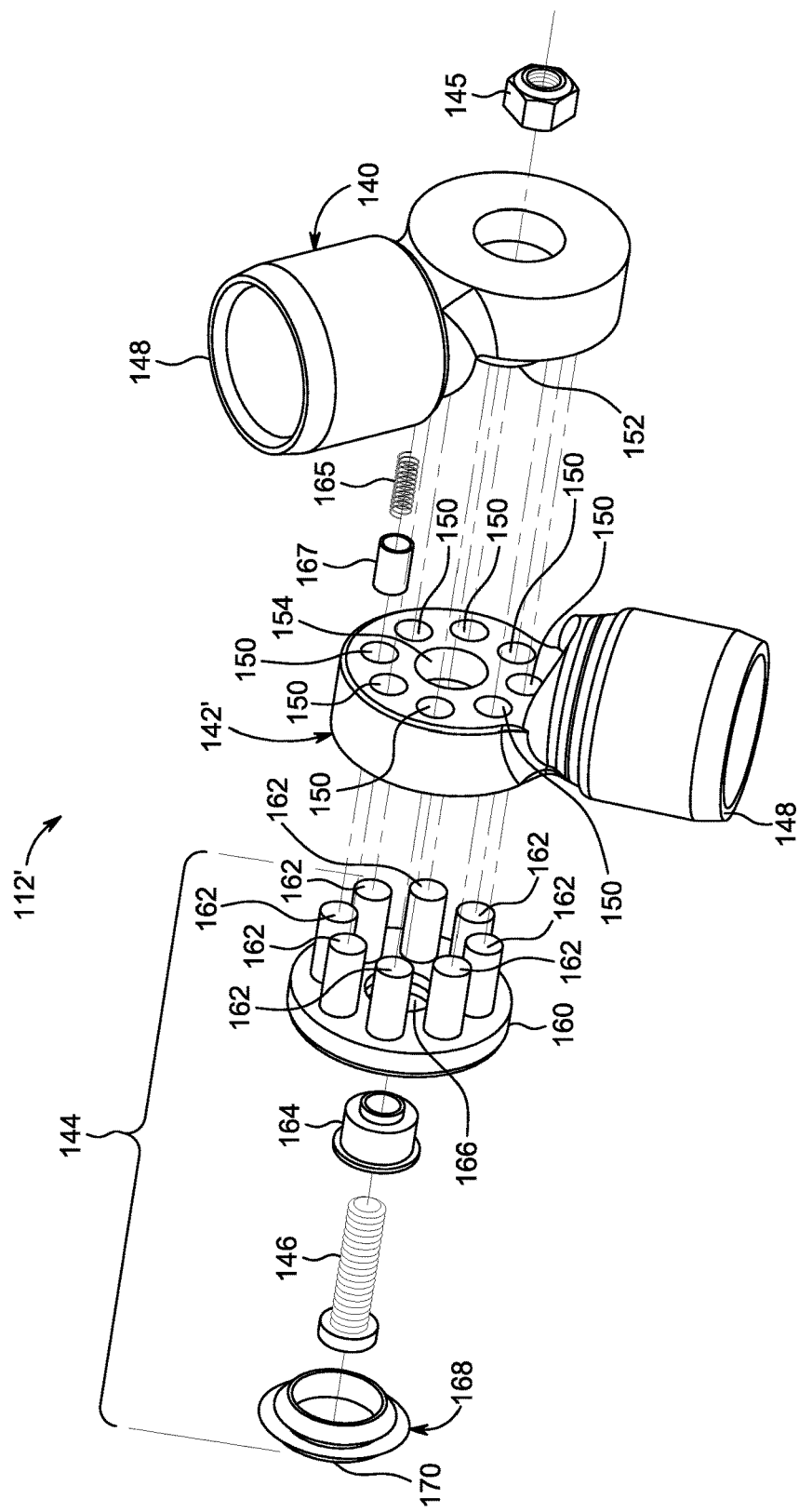
FIG. 11 is an exploded perspective view of a pivot joint of the reconfigurable pet potty system of FIG. 1.

Turning to FIGS. 10, 11, 13, and 14, each of the joint 112 and alternate joint 112' includes a male receiver 140, a female receiver 142 or female receiver 142', and a locking mechanism 144 that are slidably connected via a fastener, i.e., a nut 145 and a bolt 146. Each of the receivers 140, 142, 142' include one or more receiver portions 148 that is operable to securely receive an end of one of the frame members 116. In the preferred embodiment, each of the receiver portions 148 are sized and shaped to engage the end of one of the frame members 116 via a friction-fit engagement without any adhesive, thereby allowing disassembly of the system 100, e.g., for installation and/or removal of the sheet 130. It is foreseen, however, that the frame members 116 may be permanently secured within the receiver portions 148 via an adhesive, thereby forming an adhesive bond therebetween and preventing complete disassembly of the system 100, without deviating from the scope of the present inventive concept. As illustrated by FIG. 11, the female receiver 142' of the joint 112' has a single one of the one or more receiver portions 148 and, therefore, is operable to only accommodate a single one of the frame members 116.

Each of the receivers 140, 142, 142' includes a plurality of apertures 150 circumferentially arranged in identical patterns about a disk 151 of each of the receivers 140, 142, 142'. The apertures 150 define a circumferential perimeter on each of the receivers 140, 142, 142'. Each of the apertures 150 extends at least partially through its respective one of the receivers 140, 142, 142'. The present inventive concept includes at least four apertures, preferably at least six apertures, and most preferably eight apertures 150, with each of the apertures 150 extending entirely through the female receiver 142, 142' and only partially through the male receiver 140. It is foreseen, however, that there may be fewer or more of the apertures 150 and/or one or more of the apertures 150 may extend entirely through each of the receivers 140, 142, 142' without deviating from the scope of the present inventive concept. A plurality of intermediate apertures 153 are positioned in between each of the apertures 150 of the female receiver 142. Each of the intermediate apertures 153 define an outermost circumferential perimeter that adjoins to and/or overlaps with an outermost circumferential perimeter of adjacent ones of the apertures 150 of the female receiver 142. The intermediate apertures 153 and the apertures 150 of the female receiver 142 have a same circumference and/or circumferential perimeter relative to each other. The intermediate apertures 153 do not extend all of the way through the female receiver 142. Each of the intermediate apertures 153 terminate at an abutment surface positioned within the female receiver 142 such that each of the intermediate apertures 153 has a same depth relative to each other.

The male receiver 140 includes a hub 152, which protrudes from a surface of the disk 151 at a center of the perimeter defined by the apertures 150 of the male receiver 140. The hub 152 is sized and shaped to be at least partially received within an orifice 154 of the female receiver 142, 142', such that the hub 152 is operable to nest within the orifice 154 of the female receiver 142, 142'. The hub 152 and the orifice 154 form a rotatable connection therebetween. In this manner, the female receiver 142, 142' is operable to rotate or pivot about the male receiver 140 via the rotatable connection formed by the hub 152 and the orifice 154. When the system 100 is fully assembled, pivoting of the joints 112, 112' causes the frames 106, 108 to pivot relative to the frame 104.

When the receivers 140 and 142 or 140 and 142' are pivoted with respect to each other, each of the apertures 150 of the male receiver 140 becomes aligned with either (1) one of the apertures 150 of the female receiver 142, 142', or (2) one of the intermediate apertures 153 of the female receiver 142, 142'. The receivers 140, 142, 142' define a maximum range of pivot in either direction of the joints 112, 112', with the receiver 142 defining a smaller range of pivot relative to the receiver 142', which defines a larger range of pivot. In the preferred embodiment, each of the apertures 150 of the male receiver 140 are operable to align with (1) a plurality of different apertures 150 of the female receiver 142, 142', or (2) a plurality of different intermediate apertures 153 of the female receiver 142, 142', at a plurality of different points along the pivot range when the receiver 140 is pivoted with respect to the receiver 142 or the receiver 142', as is further discussed hereafter.

The locking mechanism 144 includes a button 160 with a plurality of posts 162, i.e., at least four posts, preferably at least six posts, and most preferably eight posts, protruding from a rear surface thereof. Each of the plurality of posts 162 are sized and shaped to extend into and be slidably received by one of the apertures 150 of the female receiver 142, 142'. In the preferred embodiment, each of the plurality of posts 162 is operable to extend through and completely or at least substantially fill each of the apertures 150 of the female receiver 142, 142' and partially fill each of the intermediate apertures 153 of the female receiver 142, 142', so that a planar end surface of each of the plurality of posts 162 aligns with a planar outermost surface of the female receiver 142, 142', thereby forming a common flat, planar surface extending between the planar end surface of the plurality of posts 162 and the outermost surface of the receiver 142, 142'. The partial filling of the intermediate apertures 153 by the plurality of posts 162 results in a decreased area and an altered shape of each internal void defined by each of the intermediate apertures 153. It is foreseen that each of the plurality of posts 162 may be designed to extend partially through one or more of the apertures 150 of the female receiver 142, 142' and partially and/or entirely through one or more of the apertures 150 of the male receiver 140, and/or be initially received by the female receiver 142, 142' and subsequently received by the male receiver 140, without deviating from the scope of the present inventive concept.

The button 160 includes a positioning element 164 that is concealed by a cap 168, when the locking mechanism 144 is fully assembled. The positioning element 164 has a collar extension on a tip thereof such that, when the positioning element 164 is secured within an orifice 166 of the button 160, the collar extension extends through the orifice and abuts the hub 152, thereby causing the positioning element 164 to facilitate positioning of the button 160 with respect to the receivers 140, 142, 142', and alignment of the posts 162 with the apertures 150 of the receivers 140, 142, 142'. It is foreseen that the positioning element 164 may or may not include a lip and/or may have an increased or decreased thickness without deviating from the scope of the present inventive concept.

A biasing assembly, i.e., a spring 165 partially received within and at least partially supported by a sleeve 167, is slidably secured between the receivers 140, 142, 142', with either end of the biasing assembly at least partially installed within the (1) aperture 150 of the receiver 140; and (2) either the apertures 150 of the receiver 142, 142' or the intermediate apertures 153 of the receiver 142, 142'. In this manner, the spring 165 abuts an internal end wall of a corresponding one of the apertures 150 of the receiver 140, and the sleeve 167 is slidably received along internal sidewalls of the apertures 150 of the receiver 140, along internal sidewalls of the apertures 150 and/or the intermediate apertures 153 of the receiver 142, 142' such that an end of each of the sleeves 167 is operable to abut either an end wall of the apertures 150 or the intermediate apertures 153 of the receiver 142, 142'. Thus, the biasing assembly is trapped between the receivers 140, 142, 142', and is operable to maintain the receivers 140, 142, 142' in a fixed position relative to each other or locked, when no force is applied to the button 160, i.e., the button is not actuated. The biasing assembly operates in coordination with the button 160 and the receivers 140, 142, 142' such that, when the cap 168 is secured within the orifice 166 of the button 160, the cap 168 provides a planar top surface 170 to facilitate actuation of the button 160 in coordination with the biasing assembly. When the button 160 is actuated, i.e., by applying a force to the button 160 or depressing the button 160, the biasing function via the spring 165 of the biasing assembly is overcome, which causes the posts 162 to laterally slide or move along the apertures 150 of the female receiver 142, 142' and push the biasing assembly completely out of the apertures 150 of the female receiver 142, 142' and substantially into the apertures 150 of the male receiver 140, with the posts 162 completely or at least substantially filling each of apertures 150 of the female receiver 142, 142', thereby providing a planar surface, in combination with an outermost surface of the female receiver 142, 142'. Via the planar surface, the receivers 140, 142, 142' are operable to pivot with respect to each other until the button 160 is no longer actuated, e.g., the button 160 is released. Additionally, an area defined by each of the intermediate apertures 153 is partially filled by the plurality of posts 162, thereby converting a shape of each of the intermediate apertures 153 to a shape that is unable to receive any portion of the biasing assembly, e.g., the sleeve 167 and/or the spring 165. In this manner, an end of the biasing assembly is operable to slide along the planar surface with being received by any of the apertures 150 of the receiver 142, 142' or any of the intermediate apertures 153 of the receiver 142, 142' only while the button 160 is depressed. Thus, actuation of the button 160 causes each of the joints 112, 112' to be unlocked so that they system 100 can be reconfigured, i.e., to and from a use configuration and a storage configuration, as illustrated by FIGS. 1 and 2, respectively. With each of the joints 112, 112' unlocked, the frames 104, 106, 108 are operable to pivot with respect thereto. Specifically, the frames 104, 106, 108 are operable to pivot with respect to each other by simultaneously applying the force to the button 160 and pivoting the joints 112, 112', e.g., by applying one or more additional forces to a portion of each of the joints 112, 112' and/or a portion of each of the frames 104, 106, 108. When the force is removed from the button 160, i.e., the button 160 is released, the biasing function of the biasing assembly causes the posts 162 to automatically move toward the apertures 150 of the male receiver 140. If the apertures 150 of the male receiver 140 are not aligned with the apertures 150 of the female receiver 142, 142', e.g., because the receivers 140, 142, 142' have been pivoted to a point where the apertures 150 of the male receiver 140 and are not aligned, the posts 162 abut a surface of the disk 151. In such a scenario, the receivers 140, 142, 142' remain operable to pivot until the apertures 150 are aligned, at which point the posts 162 are received within the apertures 150 of the male receiver 140 and the receivers 140, 142, 142' are no longer operable to pivot, i.e., the joints 112, 112' are automatically locked. Alternatively, if the apertures 150 of the male receiver 140 are aligned with the apertures 150 of the female receiver 142, 142' when the button 160 is released, the posts 162 are immediately received within the apertures 150 of the male receiver 140 and the receivers 140, 142, 142' are no longer operable to pivot, i.e., the joints 112, 112' are automatically locked.

Figure 4:
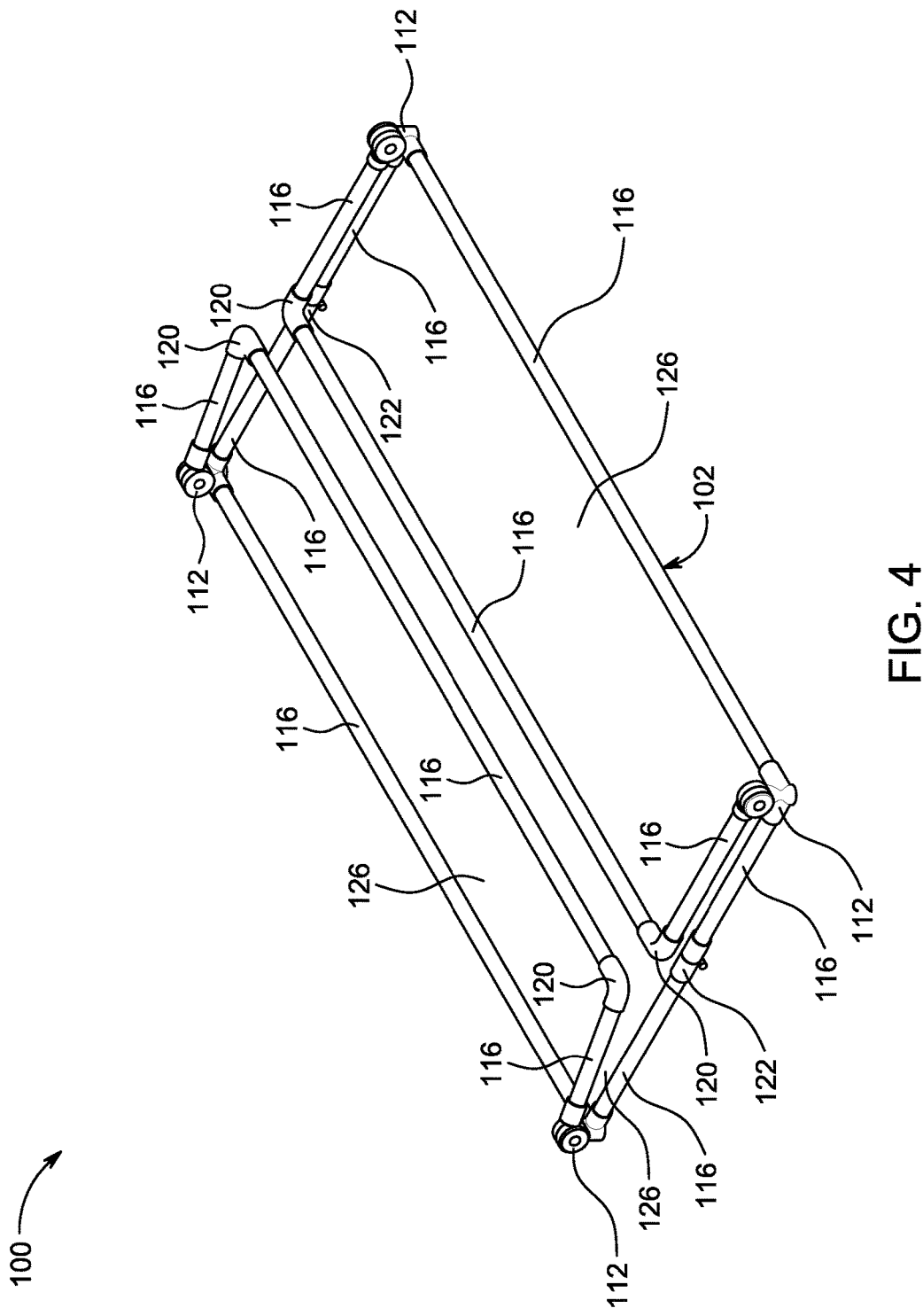
FIG. 4 is a front, left side perspective view of the reconfigurable pet potty system of FIG. 1 partially reconfigured and between a use configuration and a storage configuration.
Figure 5:
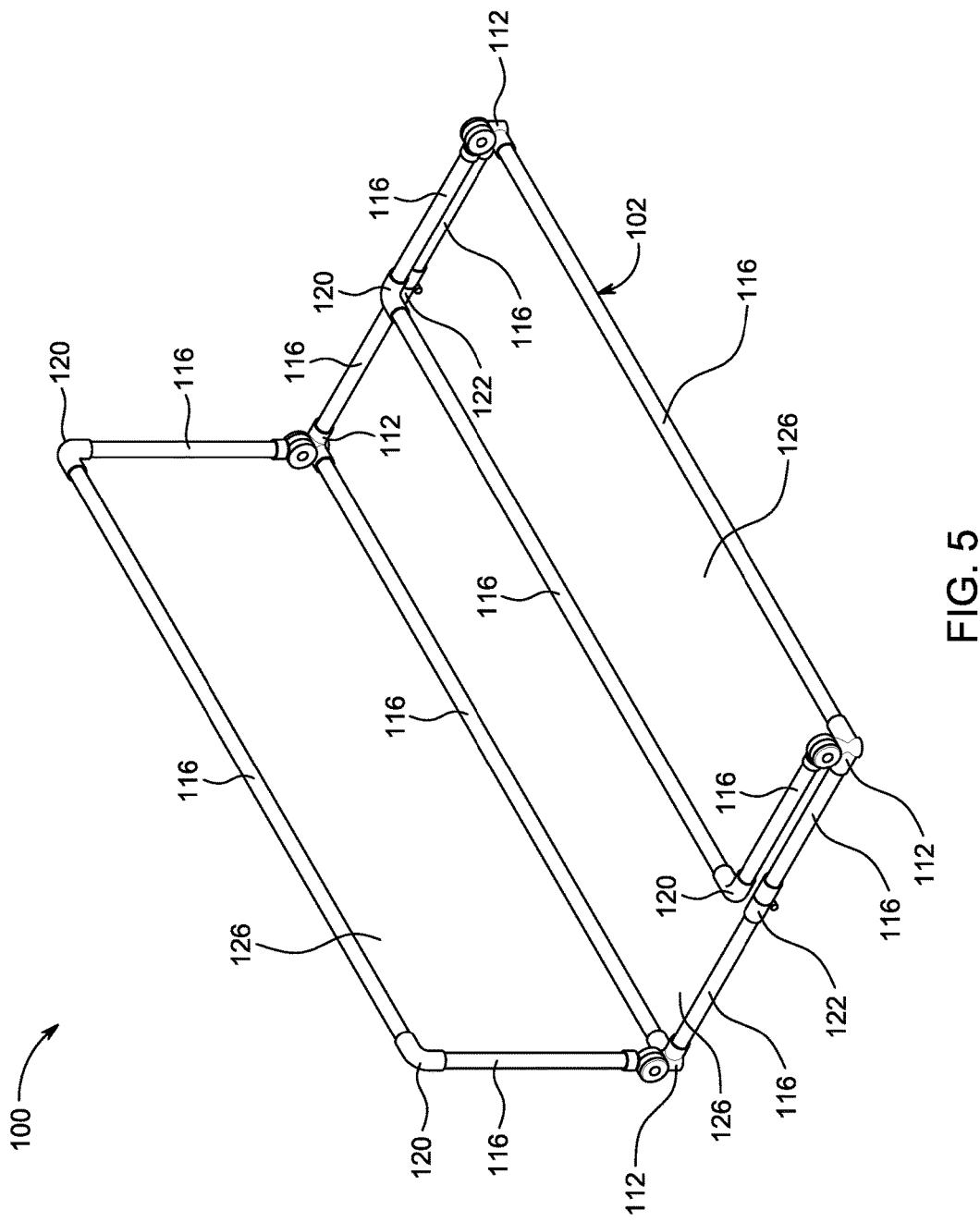
FIG. 5 is a front, left side perspective view of the reconfigurable pet potty system of FIG. 1 partially reconfigured and between a use configuration and a storage configuration.
Figure 6:
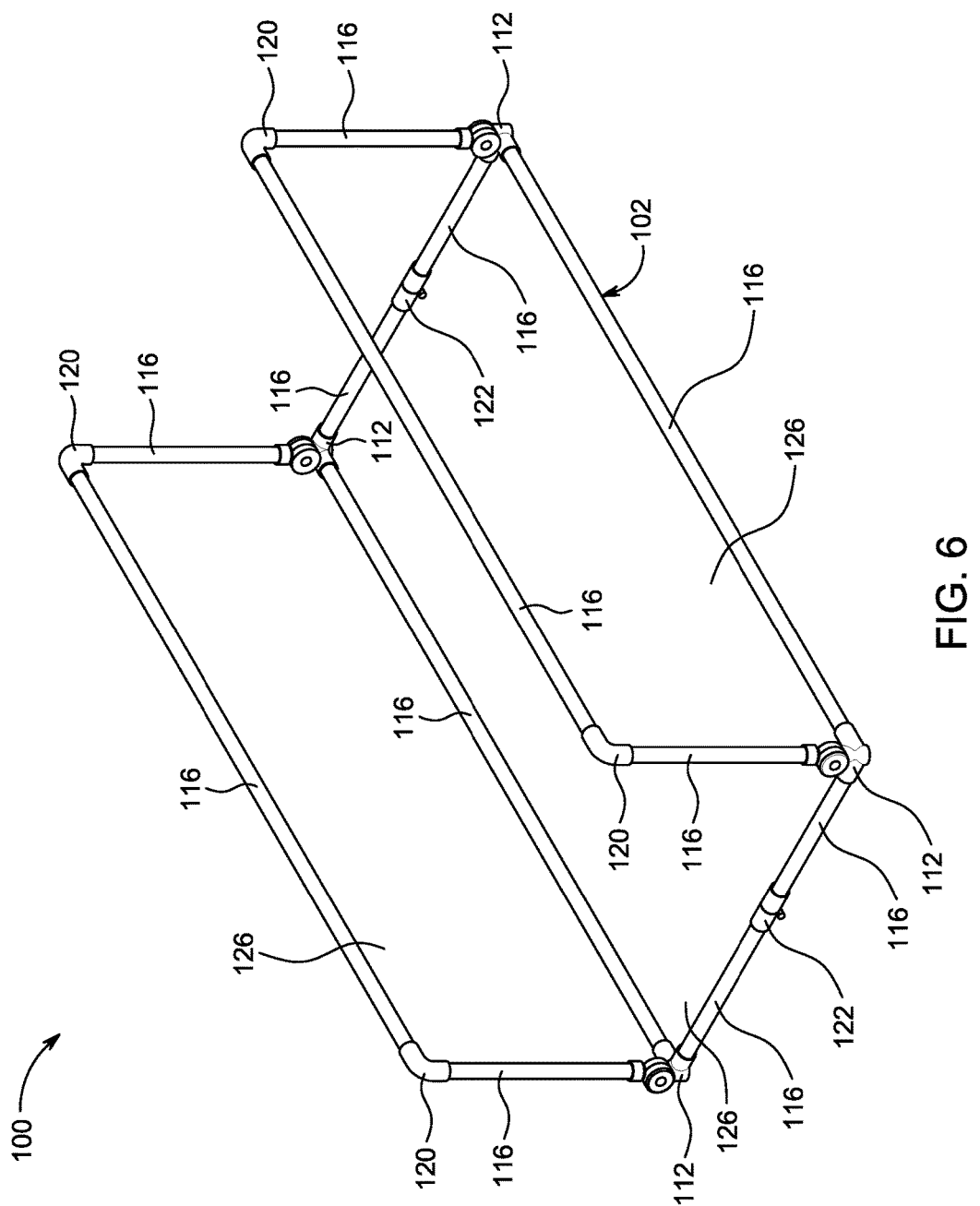
FIG. 6 is a front, left side perspective view of the reconfigurable pet potty system of FIG. 1 in a use configuration.
Figure 7:
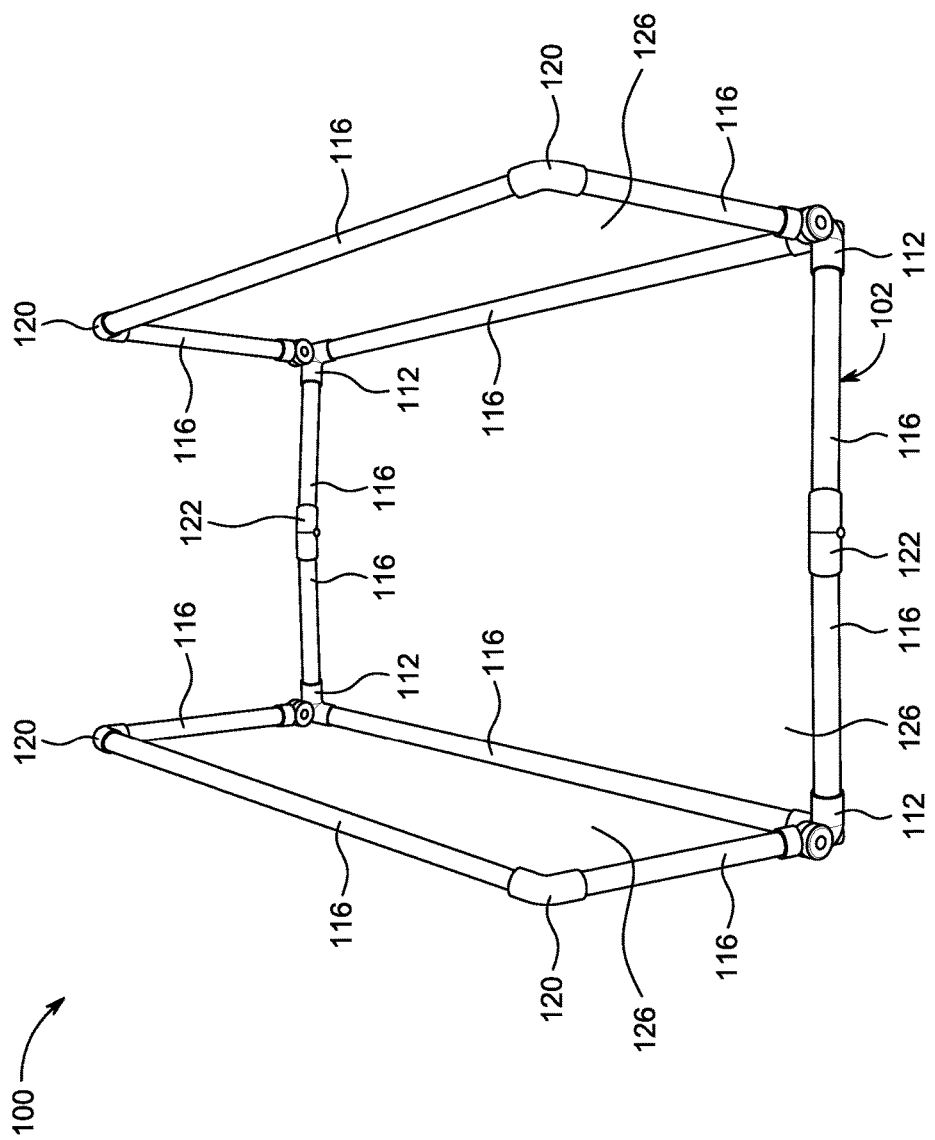
FIG. 7 is a front perspective view of the reconfigurable pet potty system of FIG. 1 in a use configuration.
Figure 8:
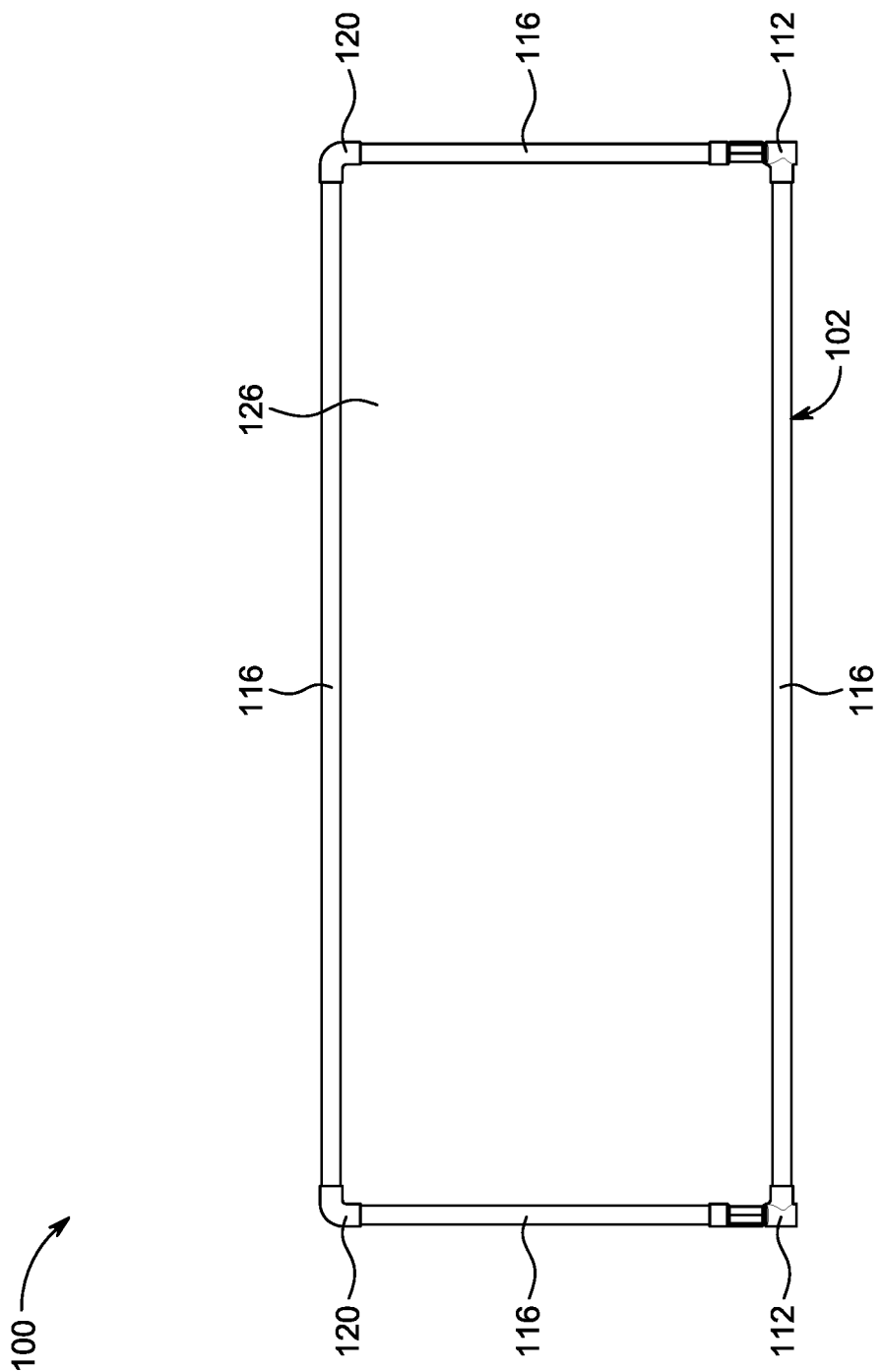
FIG. 8 is an elevated left side view of the reconfigurable pet potty system of FIG. 1 in a use configuration.
Figure 9:
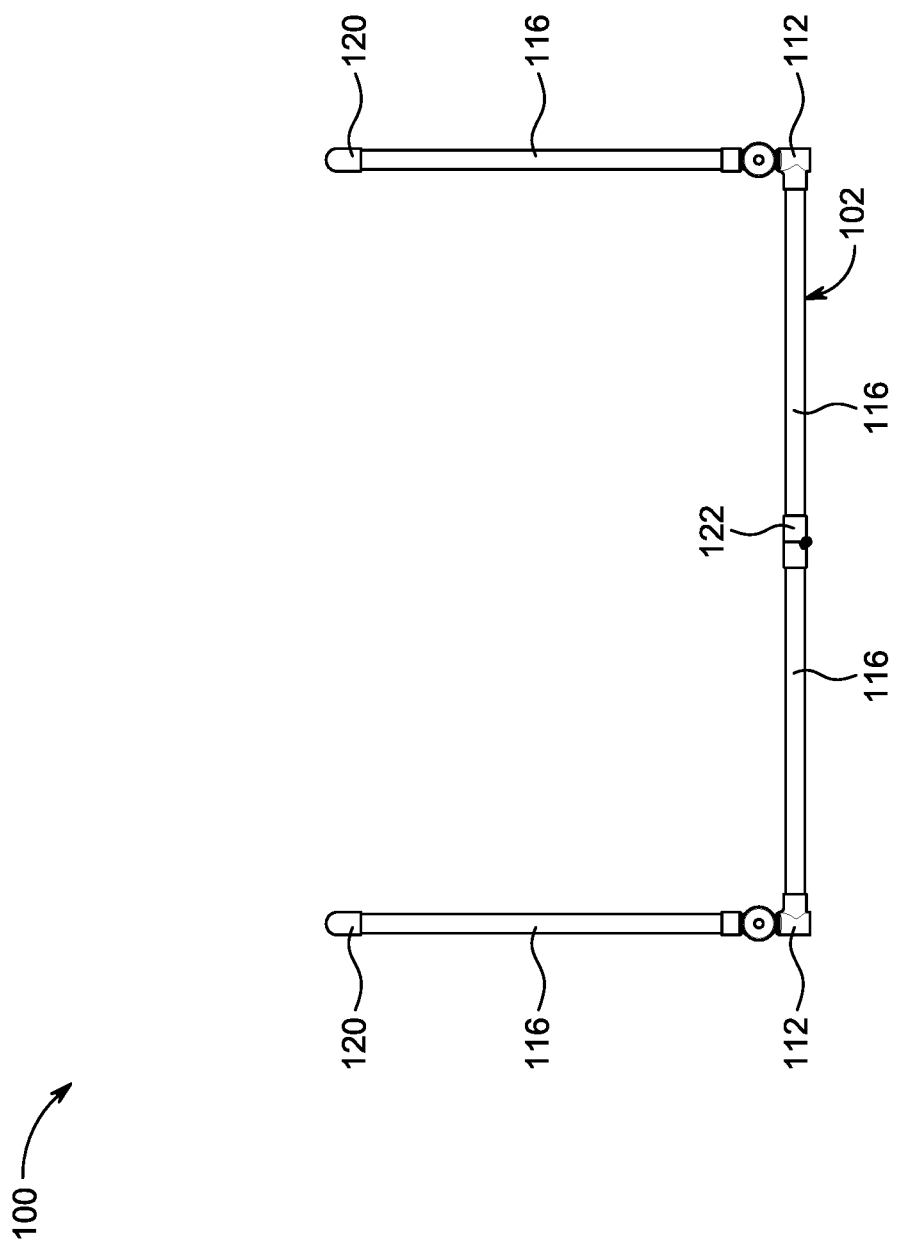
FIG. 9 is an elevated front view of the reconfigurable pet potty system of FIG. 1 in a use configuration.
Figure 10:
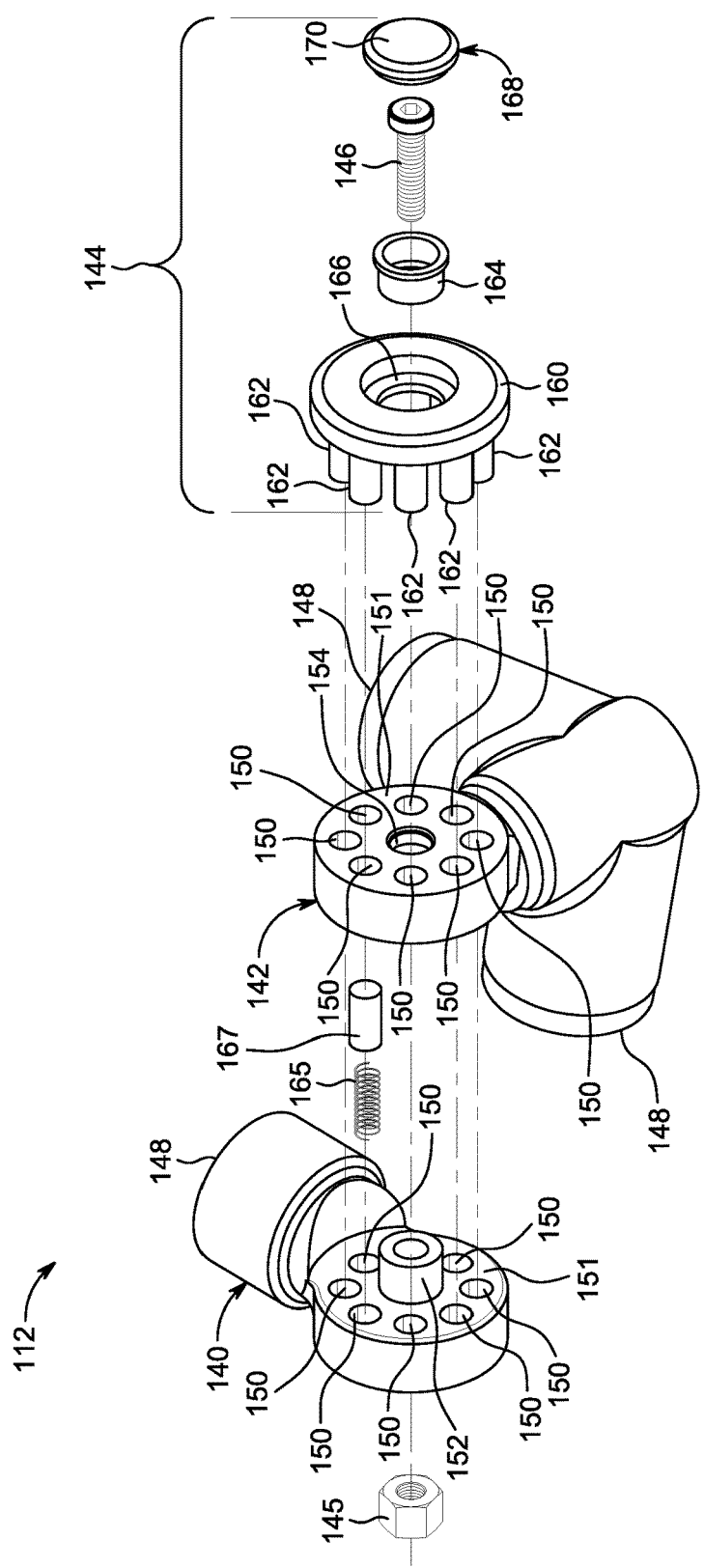
FIG. 10 is an exploded perspective view of a pivot joint of the reconfigurable pet potty system of FIG. 1.

The identical patterns of the apertures 150 define a plurality of locking points, e.g., four locking points, and a pivot range of the frames 104, 106, 108 relative to each other. In the preferred embodiment, four (4) locking points are twenty-two point five (22.5) degrees away from each other and allow each of the frames 106, 108 to be pivoted and locked in configurations that are ninety degrees relative to each other and/or the frame 104, i.e., with the frames 106, 108 extending toward and parallel to the frame 104 as illustrated by FIG. 4, extending perpendicular to the frame 104 as illustrated by FIG. 6, and extending away from and parallel to the frame 104. The receiver portions 148 provide an obstruction, which prevents a complete revolution of the receivers 140, 142, 142', thereby defining a pivot range. It is foreseen that additional locking points can be added to change the pattern of the apertures 150, e.g., by adding additional apertures, without deviating from the scope of the present inventive concept.

Figure 12:
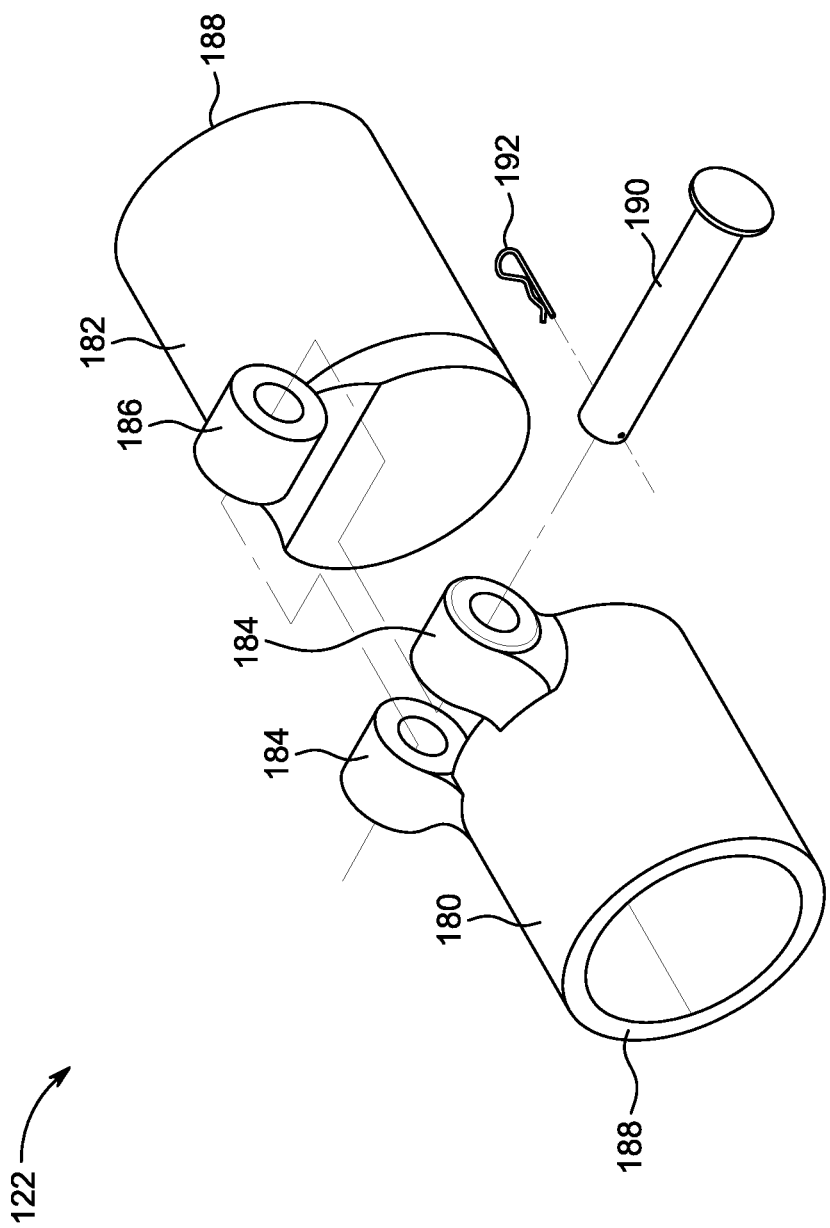
FIG. 12 is an exploded perspective view of an intermediary pivot joint of the reconfigurable pet potty system of FIG. 1.
Figure 13:
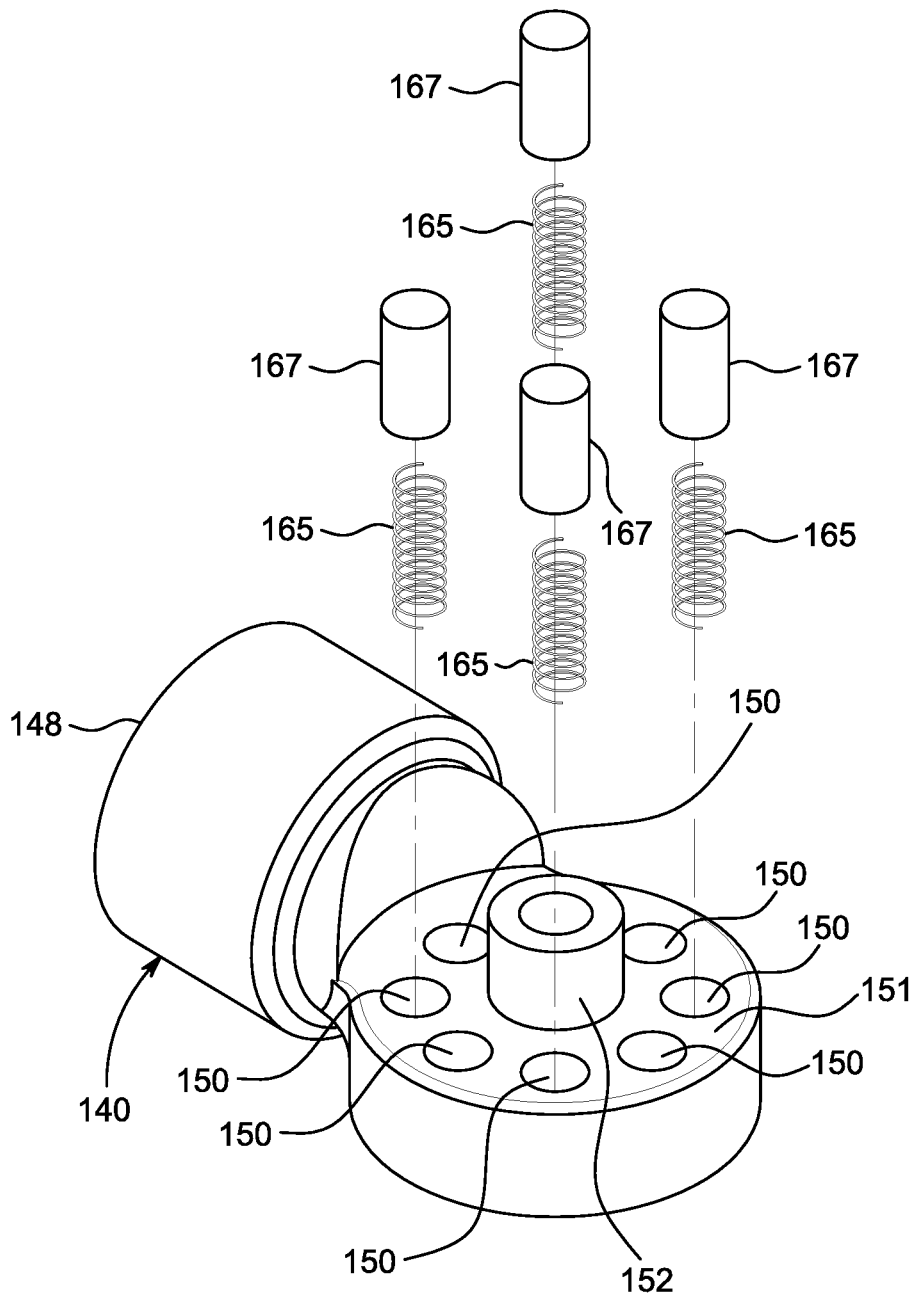
FIG. 13 is an exploded perspective view of a portion of a pivot joint of the reconfigurable pet potty system of FIG. 1.
Figure 14:
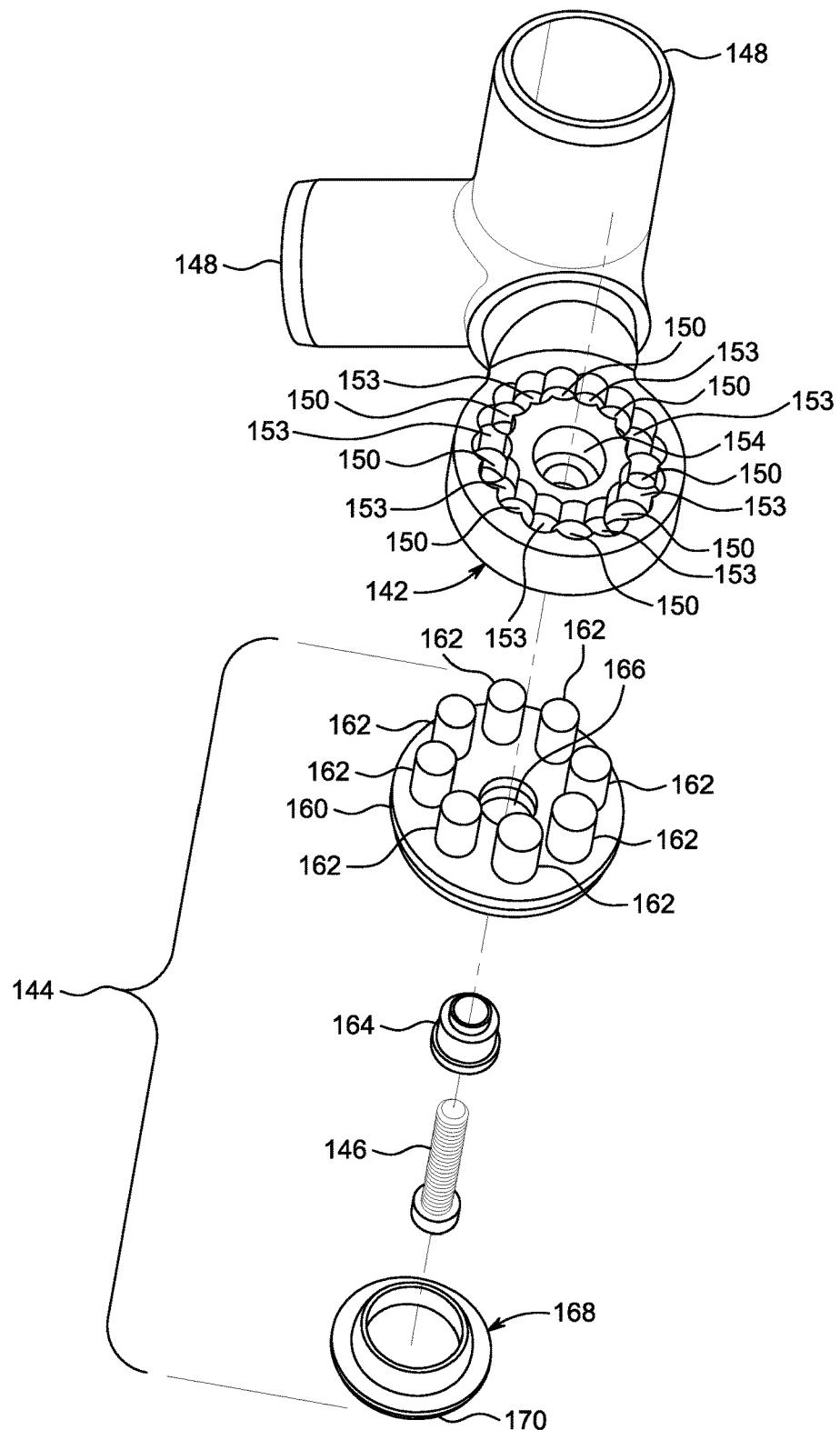
FIG. 14 is an exploded perspective view of a portion of a pivot joint of the reconfigurable pet potty system of FIG. 1.

Turning to FIG. 12, each of the intermediary pivot joint 122 includes first and second components 180, 182, and cooperative hinge components 184, 186. Each of the components 180, 182 include a receiver portion 188 that is operable to securely receive an end of one of the frame members 116. In the preferred embodiment, each of the receiver portions 188 are sized and shaped to engage the end of one of the frame members 116 via a friction-fit engagement without any adhesive, thereby allowing disassembly of the system 100, e.g., for installation and/or removal of the sheet 130. It is foreseen, however, that the frame members 116 may be permanently secured within the receiver portions 188 via an adhesive, thereby forming an adhesive bond therebetween and preventing complete disassembly of the system 100, without deviating from the scope of the present inventive concept.

The hinge components 184, 186 are operable to receive a bolt 190 therethrough. When the bolt 190 is installed through the hinge components 184, 186, the bolt 190 allows the components 180, 182 to pivot with respect to each other via the joint 122, e.g., to and from a parallel configuration, as illustrated by FIG. 1 and a non-parallel configuration, as illustrated by FIG. 2. The bolt 190 is operable to receive a resilient pin 192 therethrough, adjacent to an end thereof to prevent inadvertent removal of the bolt 190 from the hinge components 184, 186. It is foreseen that a roll pin, a cotter pin, or the like, can be used instead of the bolt 190, which does not require any additional components, e.g., a pin, to maintain its position within the hinge components 184, 186 without deviating from the scope of the present inventive concept.

By actuating the locking mechanism 144 of each of the joints 112, 112', the system 100 can be selectively converted or reconfigured to and from a use configuration, as illustrated by FIG. 1, and a collapsed storage configuration, as illustrated by FIG. 2. In the use configuration, the pad 130 is oriented within the base frame 104 to be adjacent to a finished surface, on carpet, of an interior of a residence. Further, in the use configuration the wall frames 106, 108 are oriented via the joint 112 to extend ninety degrees from the base frame 104, i.e., a plane defined by the wall frames 106, 108 extend substantially perpendicular to a plane defined by the base frame 104, thereby providing walls to confine a pet within the system 100, i.e., directly over the pad 130. In other words, the wall frames 106, 108 are operable to guide the pet over the pad 130 and confine the pet within a space defined by and between the walls frames 106, 108, while the pet urinates on the pad 130. In this manner, the system 100 is operable for use by the pet as a toilet, while protecting the interior of the residence. In the storage configuration, the wall frames 106, 108 are oriented by the joint 112 to extend substantially parallel to the base frame 104. Additionally, the joint 122 allows the base frame 104 to fold or collapse. In this manner, the joints 112, 122 cooperatively cause a footprint of the system 100 to be minimized so that transport and/or storage of the system 100 can be facilitated. It is foreseen that the present inventive concept may be designed to be only partially collapsible by replacing the joint 122 with a single, longer tubular member 104 that connects adjacent ones of the joints 112, without deviating from the scope of the present inventive concept.

Having now described the features, discoveries, and principles of the present disclosure, the manner in which embodiment of the present disclosure are constructed and used, the characteristics of the construction, and advantageous, new and useful results obtained; the new and useful structures, devices, elements, arrangements, parts and combinations, are set forth in the appended claims.

The following claims are intended to cover all of the generic and specific features of the present disclosure herein described, and all statements of the scope of the present inventive concept, which, as a matter of language, might be said to fall there between.

What is claimed is:
1. A joint comprising:
    a female receiver having (i) a set of through holes extending entirely through the female receiver, and (ii) a first set of non-through holes extending partially through the female receiver, adjacent ones of the set of through holes and the first set of non-through holes are adjoined;
    a male receiver having a second set of non-through holes extending partially through the male receiver;
    a biasing assembly operable to be at least partially housed in the male receiver and the female receiver; and
    a locking mechanism operable to drive the biasing assembly out of the female receiver,
    wherein,
        the female receiver is operable to pivot relative to the male receiver upon actuation of the locking mechanism via application of a force on the locking mechanism.
2. The joint of claim 1,
    wherein,
        individual holes of each of (i) the set of through holes, (ii) the first set of non-through holes, and (iii) the second set of non-through holes are equally sized.

3. The joint of claim 2,
wherein,
    each of the individual holes at least partially defines a circumferential sidewall, and
    adjacent ones of the individual holes have adjoining circumferential sidewalls.

4. The joint of claim 1,
wherein,
    the biasing assembly includes a spring at least partially housed in a sleeve, and
    the spring is operable to bias the sleeve away from the male receiver and into the female receiver.

5. The joint of claim 4,
wherein,
    the locking mechanism includes a post, and
    the post is operable to abut the sleeve and drive the sleeve out of the female receiver and into the male receiver upon actuation of the locking mechanism via the force.

6. The joint of claim 5,
wherein,
    the female receiver is only operable to pivot relative to the male receiver (i) upon actuation of the locking mechanism via the force, and (ii) when the biasing assembly has been entirely removed from the female receiver.

7. The joint of claim 6,
wherein,
    the biasing assembly is biased toward the female receiver such that, when the force is removed from the locking mechanism, the biasing assembly is biased toward and partially received by the female receiver.

8. The joint of claim 1,
wherein,
    the locking mechanism is slidably secured to the female receiver via a fastener.

9. The joint of claim 1,
wherein,
    the female receiver and the male receiver are independent operable to connect different portions of a device and permit reconfiguration of the device.

10. A method of manufacturing a joint, the method comprising:
    providing a female receiver having (i) a set of through holes extending entirely through the female receiver, and (ii) a first set of non-through holes extending partially through the female receiver, adjacent ones of the set of through holes and the first set of non-through holes are adjoined;
    installing a biasing assembly at least partially within a male receiver, the biasing assembly operable to be at least partially housed in the male receiver and the female receiver;
    securing the male receiver to the female receiver via a locking mechanism, the male receiver having a second set of non-through holes extending partially through the male receiver, the locking mechanism operable to drive the biasing assembly out of the female receiver,
wherein,
    the female receiver is operable to pivot relative to the male receiver upon actuation of the locking mechanism via application of a force on the locking mechanism.

11. The method of claim 10,
wherein,
    individual holes of each of (i) the set of through holes, (ii) the first set of non-through holes, and (iii) the second set of non-through holes are equally sized.

12. The method of claim 11,
wherein,
    each of the individual holes at least partially defines a circumferential sidewall, and
    adjacent ones of the individual holes have adjoining circumferential sidewalls.

13. The method of claim 10,
wherein,
    the biasing assembly includes a spring at least partially housed in a sleeve, and
    the spring is operable to bias the sleeve away from the male receiver and into the female receiver.

14. The method of claim 13,
wherein,
    the locking mechanism includes a post, and
    the post is operable to abut the sleeve and drive the sleeve out of the female receiver and into the male receiver upon actuation of the locking mechanism via the force.

15. The method of claim 14,
wherein,
    the female receiver is only operable to pivot relative to the male receiver (i) upon actuation of the locking mechanism via the force, and (ii) when the biasing assembly has been entirely removed from the female receiver.

16. The method of claim 15,
wherein,
    the biasing assembly is biased toward the female receiver such that, when the force is removed from the locking mechanism, the biasing assembly is biased toward and partially received by the female receiver.

17. The method of claim 10,
wherein,
    the locking mechanism is slidably secured to the female receiver via a fastener.

18. The method of claim 10,
wherein,
    the female receiver and the male receiver are independent operable to connect different portions of a device and permit reconfiguration of the device.

* * * * *